United States Patent [19]

Altman

[11] 4,448,504
[45] May 15, 1984

[54] REAR END PROJECTION SYSTEM EMPLOYING ASPHERICAL LENSES

[75] Inventor: Richard M. Altman, Woodland Hills, Calif.

[73] Assignee: Industrial Electronic Engineers, Inc., Van Nuys, Calif.

[21] Appl. No.: 322,516

[22] Filed: Nov. 18, 1981

[51] Int. Cl.³ .............................................. G03B 21/26
[52] U.S. Cl. ...................................... 353/36; 353/102
[58] Field of Search ...................... 353/94, 36, 102, 38, 353/30; 350/432, 167; 362/268, 331, 338

[56] References Cited

U.S. PATENT DOCUMENTS

| | | | |
|---|---|---|---|
| 1,621,741 | 3/1927 | Kellner | 353/102 X |
| 2,637,242 | 5/1953 | Osterberg et al. | 353/102 X |
| 2,931,027 | 3/1960 | Blefary et al. | 353/36 X |
| 3,244,071 | 4/1966 | Gumpertz | 353/36 |
| 3,332,318 | 7/1967 | Gessel | 353/36 X |
| 3,609,012 | 9/1971 | Street | 350/432 |
| 4,145,131 | 3/1979 | Yevick | 350/167 X |
| 4,163,604 | 8/1979 | Betensky | 350/432 |

OTHER PUBLICATIONS

Street, Chan., "A Three Element Projector Projector Condensing System", *Journal of the SMPTE*, vol. 79, No. 2, (Feb. 1970), pp. 85–87.

*Primary Examiner*—Harry N. Haroian
*Attorney, Agent, or Firm*—Ellsworth R. Roston; Charles H. Schwartz

[57] ABSTRACT

A lens construction for a character projection unit and with the character projection unit including a plurality of light sources mounted in side-by-side relation, a plurality of corresponding condensor lenses, a plurality of corresponding projection lenses, and a plurality of corresponding characters disposed between the light sources and projection lenses to form a number of separate and individually complete projection systems within a confined volume, including at least one condensing lens plate in which is formed the plurality of individual condensing lenses, at least one projection lens plate in which is formed the plurality of individual projection lenses, and each of the complete projection systems including one of the individual condensing lenses formed in the condensor lens plate and the corresponding one of the individual projection lenses formed in the projection lens plate and with at least one of the lens surfaces of each of the complete projection systems formed as an aspheric surface whereby the projection system is less sensitive to the position of the corresponding light source.

16 Claims, 4 Drawing Figures

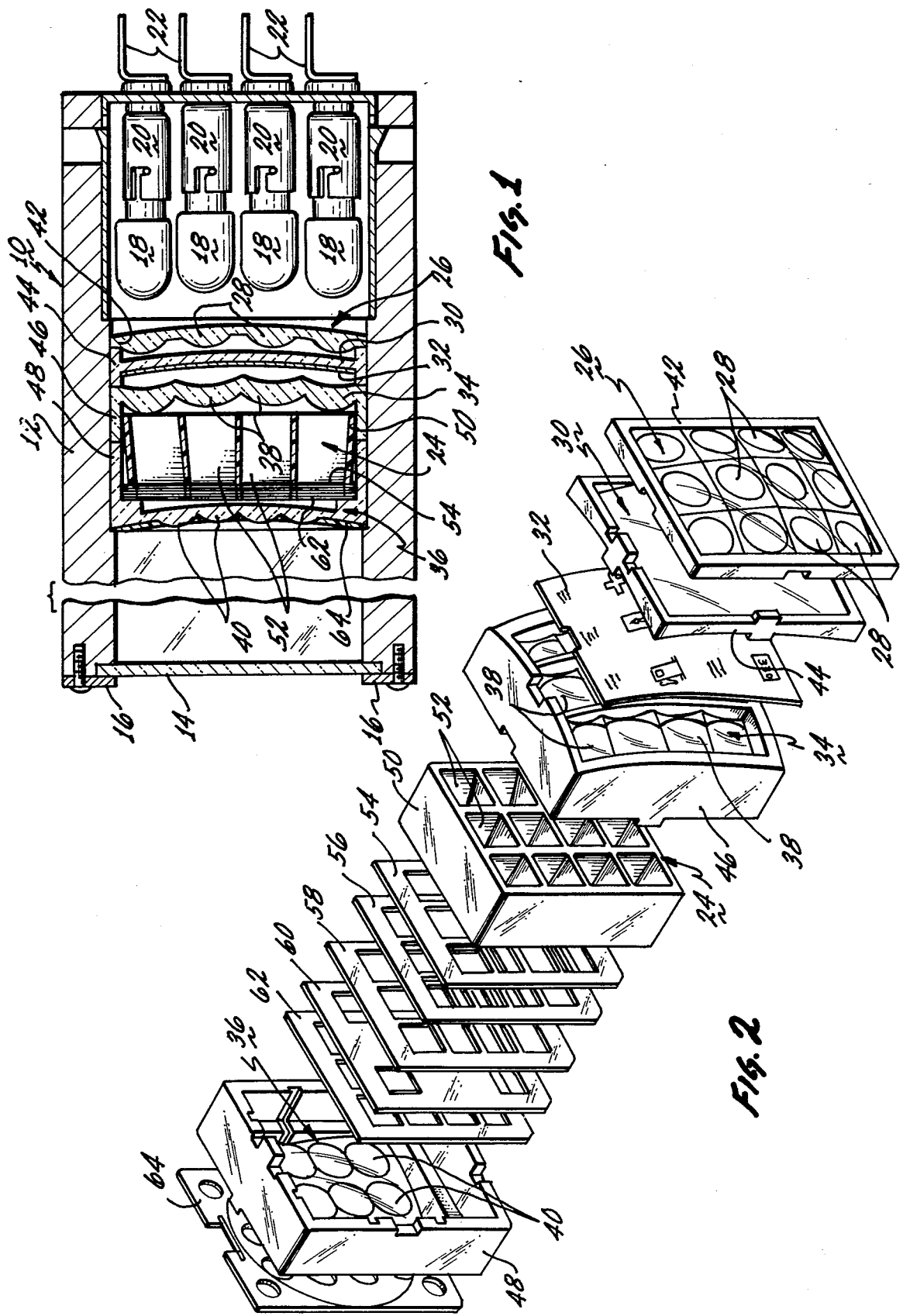

REAR END PROJECTION SYSTEM EMPLOYING ASPHERICAL LENSES

BACKGROUND OF THE INVENTION

1. Field of the Invention

The present invention relates to character projection units wherein different characters are selectively displayed on a common screen area. In particular, the present invention relates to improvements in the lens construction for such units.

2. Description of the Prior Art

In the past, character projection units have been employed using large multiples of the units to display multi-digit numbers, words or symbols. In one type of prior art unit, each projection unit incorporates a rectangular viewing screen which screen occupies a space in an overall panel display and with each space reserved for a single letter, digit or symbol. By selecting the particular number or letter projected by each unit, different multi-digit numbers and words may be displayed. Since each projection unit must be capable of displaying any of a relatively large selection of letters or numerals, the internal construction is complicated. A further complication is that the display units must be closely packed together so as to provide a conventional spacing between the digits and letters.

In another type of prior art device, the problem of compactness is solved by the employment of lens plates which support the individual lenses of a multiplicity of converging projection systems for superimposing the plurality of characters on a common display screen. Character projection units of this type may be seen by reference to prior U.S. Pat. Nos. 3,041,600 issued June 26, 1962 and 3,244,071 issued Apr. 5, 1966. In these prior art projection units the various lenses formed on the lens plates which together form the character projection units have these individual lenses formed with spherical surfaces. These spherical lens surfaces provide for a relatively sharp display of a character on the display screen if all of the elements in the projection system are properly aligned. However, with the prior art devices the spherical lens systems may produce a blurring of the image or a shadow on the screen unless all of the elements in the system are properly aligned.

In particular, the light sources are generally filament lamps and during manufacture of the lamps the filament may not be in a consistent position. With the prior art lens structures, a portion of the light projection may be outside of the aperture stop of the front projection lens because of the improper position of the filament. When this occurs, the image on the projection screen will not be clear. In the prior art it is therefore necessary to provide for an accurate assembly of the light sources so as to adjust the individual position of the lamps to make sure that the filaments are properly positioned so that the light projection falls within the aperture stop of the front projection lens. If the filament is not accurately adjusted the light projection would not be true and this could produce shadows or blurring of the image on the screen. The problem unfortunately continues even after the original assembly of the projection unit. Every time a lamp has to be replaced a number of lamps must be tried and adjusted in position to eliminate the above-described problem.

SUMMARY OF THE INVENTION

The present invention overcomes the above-described problems of the prior art by using at least one or more aspheric lens surfaces as part of the lens projection unit. With the use of the aspheric lens surfaces, the lens system has a much larger aperture stop so that misalignment of the filament position will still allow for the light projection to be within the aperture stop of the front projection lens. Essentially, the provision of a wider aperture stop provides for much lower image error at the corners and toward the diagonals so as to allow for a greater misalignment of the filament. Therefore, the specific design of the lens projection system of the present invention is much less sensitive to the filament position. Even lamps that would have been considered bad lamps in the prior art will give a shadow-free and blur free image since the larger aperture stop provides for significantly less ray aberration across the field of the image.

Since the lens construction of the present invention is less sensitive to filament position, this allows for less expensive light sources to be used even though these less expensive light sources would normally not be as accurately manufactured as to the filament position. As a further advantage, the lens projection system of the present invention provides for a system which is slightly shorter and provides for more light than the prior art devices thereby providing for an additional compactness and brightness in the lens projection system.

As indicated above, at least one or more of the lens surfaces are aspheric. In particular, the front surface of the rear condensor lens may have an aspheric surface and if it is desirable to have more than one aspheric surface the front surface of the rear projection lens may also have an aspheric surface. In one particular embodiment of the present invention, both front surfaces of the rear condensor lens and the rear projection lens have aspheric surfaces. In addition, in this one embodiment all of the lens components are made of the same material so as to provide for complete uniformity. In particular, all of the lens components are molded from a polycarbonate material although it is to be appreciated that other lens materials and specifically other plastic lens materials may be used.

BRIEF DESCRIPTION OF THE DRAWING

A clearer understanding of the present invention will be had with reference to the following description and drawings wherein:

FIG. 1 is a cross sectional view of a character projection unit showing the structure of the present invention and with the unit partially broken away to foreshorten the structure;

FIG. 2 is an exploded view of the lens projection system of the present invention;

Figure 3:
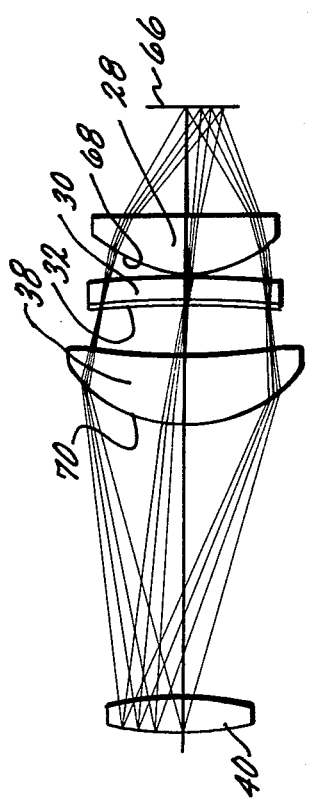
FIG. 3 illustrates the lens elements for a single projection system and illustrating a light ray pattern through the lens system.

Referring specifically to FIG. 1, a character projection unit 10 is shown and includes an outer housing 12 which supports a rectangular translucent viewing screen 14 mounted across the front face of the housing 12. The screen 14 is held in place by retainers 16. The viewing screen 14 receives projections of characters from the rear but the characters on the screen 14 are viewed from the front. The screen 14 may include a conventional frosted surface on the rear side of the screen.

At the end of the housing remote from the screen 14, a compact group of small lamps 18 may be mounted in a corresponding group of sockets 20. An electrical connection to the individual lamps may be made by means of a terminal 22 extending from the rear of each socket 20.

Intermediate the plurality of lamps 18 and the viewing screen 14 is the lens construction 24 forming the aspheric lens construction of the present invention. The lens construction 24 is formed from a plurality of separate members and with each member including a plurality of elements to provide for a plurality of individual light paths so as to produce a plurality of converging projection systems for selectively projecting any one or any number of a plurality of characters onto the rectangular viewing screen 14. The various members forming the lens construction 24 are shown in an exploded view in FIG. 2.

Starting from the individual member of the lens construction 24 closest to the lamps 18 and then progressing in a direction towards the viewing screen 14 the individual members are as follows:

The first member is a rear condensor lens plate 26 including a plurality of individual substantially identical lenses 28. The individual lenses 28 are integrally formed within the lens plate 26. Adjacent the rear condensor lens plate 26 is a front condensor lens plate 30 which also serves as a support for a film member 32. The film 32 may include a plurality of individual characters each positioned to correspond to the position of an individual lens 28. The front condensor lens plate 30 has a single unitary surface as shown in FIG. 1 but individual portions of the lens plate 30 serve as front condensor lenses for corresponding rear condenser lenses 28. The lens plates 26 and 30 therefore together form the condensor system to direct the light from the individual lamps 28 at the plurality of separate positions on the film 32 bearing the various characters.

In front of the film 32 is the projection lens system for projecting the individual characters formed on the film 32 to be viewed at the front viewing screen 14. The projection lens system includes the rear projection lens plate 34 and the front projection lens plate 36. Each of these lens plates includes a plurality of lenses such as rear projection lenses 38 which are integrally formed into the lens plate 34 and front projection lenses 40 which are integrally formed into the lens plate 36.

As can be seen in FIGS. 1 and 2, the four (4) lens plate members 26, 30, 34 and 36 all include frame portions which are referred to respectively as frame portions 42, 44, 46 and 48. The frame portions 42 through 48 all include interlocking key sections to ensure proper assembly of the plurality of lens plates into the unitary lens construction 24. The frame members 42 through 48 also ensure the proper spacing of the various individual integral lenses to provide for the proper projection of the individual characters. In addition, in between the separate lens plates, other portions of the lens construction may be properly positioned. In particular, as indicated above, the film 32 is positioned adjacent the front condensor lens plate 30 and the film is actually positioned between the front condensor lens plate 30 and the rear projection lens plate 34. Intermediate the front and rear projection lens plates 36 and 34, a plurality of other members may be positioned.

Specifically, as shown in FIGS. 1 and 2, a grid member 50 is located between the lens plates 34 and 36, which grid member has a plurality of separate pathways 52 corresponding in number to the individual projection paths. The separate pathways 52 assist in the display of individual characters by reducing spurious transmission of light between individual projection paths.

A plurality of color filters 54 through 60 may be used so as to provide for a particular colored background to the individual characters projected from the film 32. In particular, the filter 54 may be a yellow filter, the filter 56 may be a blue filter, the filter 58 may be a green filter and the filter 60 may be a red filter. The individual filter include cutouts so that essentially only a single color filter is present at each individual position corresponding to the separate characters on the film 32. A final grid plate 62 may be included to further eliminate spurious transmission of light between individual characters. Similarly, the exterior of the front projection of lens plate 36 may also include a grid member 64 which includes a plurality of openings corresponding to the individual character projection paths and again helps to differentiate and eliminate any spurious transmission of light.

In the lens construction 24, the individual lens plates 26, 30, 34 and 36 are each, approximately, spherically curved on a radius from the center of the screen 14. However, the individual lenses formed on these lens plates have individual curved surfaces so as to provide for the proper projection of the individual characters. In the prior art, these individual lenses were formed with spherical surfaces. In the lens construction of the present invention at least one, and preferably two, of the lens surfaces has an apheric configuration. In particular, the front surface of each of the individual rear condensor lenses 28 has an aspheric configuration and in addition the front surface of each of the individual rear projection lenses 38 has an aspheric configuration. This may be seen more clearly with reference to FIGS. 3 and 4 which show the light ray patterns through one of the plurality of individual lens projection systems.

FIG. 3 illustrates the complete path from a plane 66 representing the position of the filament in the light source through the rear condensor lens 28, the front condensor lens plate 30 at an individual position, the film 32 at an individual character position, the rear projection lens 38 and the front projection lens 40. Ideally, the light source 18 would be properly positioned in a center position so as to provide for the projection of light through the lens system including an individual character contained on the film 32, so as to provide for a clear and sharp image of the character on the screen 14. Unfortunately, the filament represented by the plane 66 may be in different positions so that portions of light projected through the system may be outside of the effective aperture stop of the front projection lens 40. As described above, this means that with the prior art lens constructions, the filament must be accurately positioned during the assembly procedure. Moreover, any time an individual lamp is replaced, a plurality of lamps must be tried until a proper one is found so a to ensure that all of the light projection falls within the aperture stop of the front projection lens 40.

Figure 4:
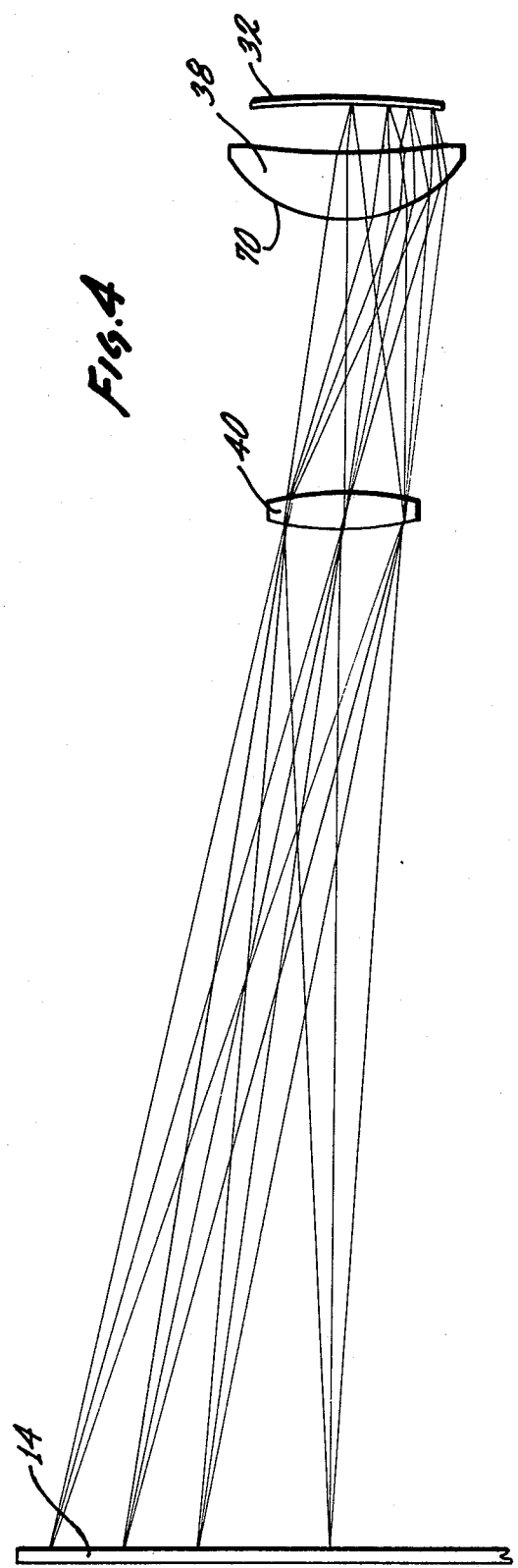
FIG. 4 illustrates the lens elements for the projection portion and shows the light ray pattern from film to the display screen.

In the present invention, as shown in FIGS. 3 and 4, at least one of the lens surfaces is aspheric so as to make the lens system more tolerant to misalignment of the filament. In particular, at least a front surface 68 of each of the individual rear condensor lenses 28 has an aspheric surface. In a preferred embodiment of the invention, the front surface 70 of the rear projection lens also is formed with an aspheric surface. As can be seen in FIG. 3, even when the effective position of the filament as shown by the plane 66 is off center as shown by or blur on the screen. If there is a blur at the film this would produce a blur on the screen.

For a specific example of a lens system using polycarbonate for all the lenses in the system, the following table shows the characteristics of the individual lenses and the general equation for aspheric surfaces and the constants for the two particular aspheric surfaces.

| ELE-MENT | RADII FOR FIRST SURFACE | RADII FOR SECOND SURFACE | LENS THICKNESS AND DISTANCE BETWEEN ELEMENTS | CLEAR APERTURE DIAMETER FOR FIRST SURFACE | CLEAR APERTURE DIAMETER FOR SECOND SURFACE | MATERIAL |
|---|---|---|---|---|---|---|
| 14 | ∞ | ∞ | .0000<br>1.8552 | Diagonal of screen = 1.0600 | | |
| 40 | .4633 | −1.1360 | .0570<br>.4859 | .2080 | Diagonal of Aperture Stop = .2000 .2169 | Polycarbonate |
| 38 | A(1) | 1.7714 | .1173<br>.0791 | .3529 | .3283 | Polycarbonate |
| 32 | −2.6030 | −2.6130 | .0100<br>.0000 | .2874 | .2843 | Film |
| 30 | −2.6130 | −2.6530 | .0400<br>.0100 | .2843 | .2808 | Polycarbonate |
| 28 | A(2) | −9.1950 | .0955 | .2756 | .2550 | Polycarbonate |
| 18 | | | .1900 | Clear aperture diameter of filament = .1092 | | |

NOTES
Dimensions are in inches
Focal length for condensor system = 1.0422 F/no = .9833
Focal length for projection system = .7116 F/No = 2.4041
Positive radius indicates the center of curvature is to the right.
Negative radius indicates the center of curvature is to the left.
General equation of any aspheric surface Z is:

$$Z = \frac{(CURV)Y^2}{1 + (1 - (1 + K)(CURV)^2 Y^2)^{\frac{1}{2}}} + (A)Y^4 + (B)Y^6 + (D)Y^{10} \quad \text{where } Y = \text{height}$$

Constants for A(1) and A(2) are as follows:

| ASPHERIC | CURV = 1/R | K | A | B | C | D |
|---|---|---|---|---|---|---|
| A(1) | 4.52209783 | −.811442 | 2.19256E + 00 | 6.14583E + 00 | 0.00000E + 00 | 0.00000E + 00 |
| A(2) | 5.84274054 | −.946519 | −4.94153E + 00 | −6.54417E + 02 | 0.00000E + 00 | 0.00000E + 00 | the rays of light emanating from the position below the center, the use of the aspheric surfaces provides that the rays of light as they pass through the front projection lens 40 are still within the effective aperture stop of the lens 40. The overall aperture stop of the system shown in FIG. 3 is therefore much larger than prior art systems due to the use of the aspheric surfaces so that even with misalignment of the filament position the light projection will be within this larger overall aperture stop.

Also, the use of the aspheric surface 68 of the rear condensor lens 28 provides for the light being properly focused as it passes through the film 32 which contains the individual character to be displayed. As shown in FIG. 4, if the light is properly directed at the film 32, this helps to ensure that the projected light through the projection lens portion of the system provides for the light being properly focused at the viewing screen 14. The use of the aspheric surface 70 of the rear projection lens again helps to ensure a sharper image at the viewing screen 14. In the prior art, the places where the image tended to blur would be at the extreme corners such as along the diagonals from the center position. The use of the aspheric surfaces reduces significantly the ray aberrations at these corner positions and thereby improves the image clarity.

With the present invention, using the aspheric surfaces, the design is much less sensitive to filament position and even lamps which had been considered as bad in the prior art will give a shadow-free and blur free image since there is considerably less ray aberration using the aspheric lenses. In general, it can be stated that if there is a blur at the position of the aperture stop due to filament misalignment, this would produce a shadow It is to be appreciated that the above table and constants is for a preferred embodiment of the invention, but that other embodiments of the invention using aspheric surfaces may be made. For example, additional embodiments of the invention which produce improved performances over the prior art devices have been designed using a similar layout to the preferred embodiment wherein the condenser lens includes two separate lenses and with an aspheric surface formed as the front surface of the rear condenser lens and wherein the projection lens includes two separate lenses and with an aspheric surface formed as the front surface of the rear projection lens. In these additional embodiments, materials other than polycarbonate may be used such as acrilic material and with other combinations of surface configuration.

Another design includes a layout using a single condenser lens having front and rear aspheric surfaces and a projection lens including three separate lenses and with the front surface of the rear projection lens having an aspheric surface. A further design includes a condenser lens formed as two lenses and with the rear surface of the front condenser lens and the front surface of the rear condenser lens having aspheric surfaces, and with the projection lens formed as two lenses and with the front and rear surfaces of the front projection lens having aspheric surfaces and with the front surface of the rear projection lens having an aspheric surface.

The present invention therefore is directed to a lens construction for character projection units having at least one of the lenses including an aspheric surface so as to provide for an improved character display. In the particular embodiment of the invention shown, a total of twelve (12) individual characters may be displayed and with each character transmitted through a separate channel. In the particular embodiment, the twelve (12) channels are superimposed at the front screen and depending upon the energization of the individual lamps, particular ones or combinations of the characters may be displayed at the front screen.

Although the invention has been described with reference to a particular structural embodiment and a number of other examples of the lens construction have been described, it is to be appreciated that various adaptations and modifications may be made and the invention is only to be limited by the appended claims.

I claim:

1. A character projection unit for projecting on a screen images of characters on a film, including,
    a plurality of light sources mounted in side-by-side relation, the light sources constituting filament lamps at least some of which have misaligned filaments,
    a plurality of condensor lenses mounted in side-by-side relation and having oppositely disposed first and second surfaces,
    a first plurality of projection lenses mounted in side-by-side relation between the condensor lenses and the screen and having oppositely disposed first and second surfaces and having aperture stops of particular dimensions,
    means for supporting the film at a position between the condensor lenses and the projection lenses in the first plurality,
    at least one condensor lens plate in which is disposed the plurality of individual condensing lenses, and
    at least one projection lens plate in which is disposed the plurality of individual projection lenses,
    a plurality of complete projection systems each including an individual one of the condensor lenses formed in the condensor lens plate and a corresponding one of the individual projection lenses formed in the projection lens plate, and
    at least one of the lens surfaces of each of the condensor lenses and projection lenses being formed as an aspheric surface for providing for the focusing of the light from the misaligned filaments of the filament lamps on the film and for assuring the passage of substantially the entire images from the film through the apeture stops of the particular dimensions on the projector lens and for the focusing of the images from the film on the screen.

2. The lens construction of claim 1 wherein
    a second plurality of projection lenses are disposed between the first plurality of condensor lenses and the first plurality of projection lenses and each of the projection lenses in the second plurality is optically associated in an individual one of the projection systems with an individual one of the condensor lenses in the plurality and an individual one of the projection lenses in the first plurality.

3. The lens construction of claim 2 wherein
    the projection lenses in the second plurality are provided with aspheric surfaces to facilitate the focusing of the light from the source on the film and the passage of the light through the aperture of the particular dimensions in the projection lenses in the first plurality and the focusing of the images from the film on the screen.

4. The lens construction of claim 1 wherein
    the condensor lenses in the plurality include front and rear condensor lens surfaces and wherein the aspheric surfaces are formed on the front surfaces of the condensor lenses.

5. The lens construction of claim 1, including,
    means for mounting the film at a position between the condensor lenses in the plurality and the projection lenses in the first plurality, and
    a condensor lens plate supported on the mounting means between the condensor lenses in the plurality and the position of the film.

6. The lens construction of claim 3 wherein
    the condensor lenses in the plurality include front and rear condensor lens surfaces and the projection lenses in the second plurality include front and rear projection lens surfaces and wherein the aspheric surfaces are formed on the front surfaces of the condensor lenses in the plurality and the projection lenses in the second plurality.

7. The lens construction of claim 6 wherein
    the support means for the film includes a condensor plate.

8. The lens construction of claim 7 constructed in accordance with the following table and data and where the viewing screen for the character projection unit is designated in the table as element 14, the projection lenses in the first plurality are designated in the table as elements 40, the projection lenses in the second plurality are designated as elements 38, the film is designated as element 32, the condensor lens plate is designated as element 30, and the condensor lenses in the plurality are designated as element 28 and the light sources are designated as elements 18:

| ELEMENT | RADII FOR FIRST SURFACE | RADII FOR SECOND SURFACE | LENS THICKNESS AND DISTANCE BETWEEN ELEMENTS | CLEAR APERTURE DIAMETER FOR FIRST SURFACE | CLEAR APERTURE DIAMETER FOR SECOND SURFACE | MATERIAL |
|---|---|---|---|---|---|---|
| 14 | ∞ | ∞ | .0000 | Diagonal of screen = 1.0600 | | |
| | | | 1.8552 | | | |
| 40 | .4633 | −1.1360 | .0570 | .2080 | .2169 | Polycarbonate |
| | | | .4859 | Diagonal of Aperture Stop = .2000 | | |
| 38 | A(1) | 1.7714 | .1173 | .3529 | .3283 | Polycarbonate |
| | | | .0791 | | | |
| 32 | −2.6030 | −2.6130 | .0100 | .2874 | .2843 | Film |
| | | | .0000 | | | |
| 30 | −2.6130 | −2.6530 | .0400 | .2843 | .2808 | Polycarbonate |
| | | | .0100 | | | |
| 28 | A(2) | −9.1950 | .0955 | .2756 | .2550 | Polycarbonate |
| 18 | | | .1900 | Clear aperture diameter | | |

| ELEMENT | RADII FOR FIRST SURFACE | RADII FOR SECOND SURFACE | LENS THICKNESS AND DISTANCE BETWEEN ELEMENTS | CLEAR APERTURE DIAMETER FOR FIRST SURFACE | CLEAR APERTURE DIAMETER FOR SECOND SURFACE | MATERIAL |
|---|---|---|---|---|---|---|
| | | | | of filament = .1092 | | |

NOTES
Dimensions are in inches
Focal length for condensor system = 1.0422 F/no = .9833
Focal length for projection system = .7116 F/No = 2.4041
Positive radius indicates the center of curvature is to the right.
Negative radius indicates the center of curvature is to the left.
General equation of any aspheric surface Z is:

$$Z = \frac{(CURV)Y^2}{1 + (1 - (1 + K)(CURV)^2 Y^2)^{\frac{1}{2}}} + (A)Y^4 + (B)Y^6 + (D)Y^{10} \quad \text{where } Y = \text{height}$$

Constants for A (1) and A(2) are as follows:

| ASPHERIC | CURV = 1/R | K | A | B | C | D |
|---|---|---|---|---|---|---|
| A(1) | 4.52209783 | −.811442 | 2.19256E + 00 | 6.14583E + 00 | 0.00000E + 00 | 0.00000E + 00 |
| A(2) | 5.84274054 | −.946519 | −4.94153E + 00 | −6.54417E + 02 | 0.00000E + 00 | 0.00000E + 00 |

9. A character projection unit for projecting images of characters disposed on a film in a spatial array, including,
 a plurality of light sources mounted in a spatial array corresponding to the spatial array of the characters on the film, the light sources constituting filament lamps at least some of which have misaligned filaments,
 a plurality of condensor lenses having oppositely disposed first and second lens surfaces, the condensor lenses being mounted in front of the light sources in a spatial array corresponding to the spatial array of the light sources,
 a first plurality of projection lenses having oppositely disposed first and second lens surfaces, the projection lenses being mounted in front of the condensor lenses in a spatial array corresponding to the array of the light sources,
 means for mounting the film at a position intermediate the plurality of condensor lenses and the plurality of projection lenses, and
 a second plurality of projection lenses disposed in front of the projection lenses in the first plurality, the projection lenses in the second plurality having aperture stops of limited dimensions,
 the light sources, the condensor lenses and the projection lenses in the first and second pluralities forming a plurality of separate and individually complete projection systems within a confined volume,
 the plurality of the individual condensor lenses being formed as a unitary condensor lens plate,
 the first plurality of the individual projection lenses being formed as a first unitary projection lens plate,
 the second plurality of the individual projection lenses being formed as a secondary unitary projection lens plate,
 a screen disposed at a position forward of the projection lenses in the second plurality,
 each of the complete projection systems including one of the individual condensor lenses in the plurality and corresponding ones of the individual projection lenses in the first and second pluralities,
 at least a particular one of the lens surfaces of each of at least one of the condensor lenses and the projection lens in the first plurality being aspheric to provide for the focusing of the light from the misaligned filaments of said filament lamps light sources on the film and to assure the passage of substantially the entire images from the film through the apertures of limited dimensions in the projected lenses in the second plurality and to provide for the focusing of the images on the screen.

10. The character projection unit of claim 9 wherein the aspheric surfaces are provided on the particular surface of the condensor lenses in the plurality.

11. The character projection unit of claim 9 wherein the aspheric surfaces are provided on the particular surface of the projection lenses in the first plurality.

12. The character projection unit of claim 9 wherein the condensing lenses in the plurality include front and rear condensor lens plates and the projection lenses in the first plurality include front and rear projection lens plates and wherein the aspheric surfaces are provided on the front surfaces of each of at least one of the condensor lenses in the plurality and the projection lenses in the first plurality.

13. The character projection unit of claim 10 wherein the aspheric surfaces are provided on the front surfaces of the condensor lenses in the plurality.

14. The character projection unit of claim 9 wherein the condensor lenses include front and rear condensor lens plates and the projection lenses include front and rear projection lens plates and wherein the aspheric surfaces are provided on the front surfaces of the condensor lenses in the plurality and the projection lenses in the first plurality.

15. The character projection unit of claim 12 wherein the support means for the film includes a condensor lens plate and the condensor plate is disposed between the position of the film and the condenser lenses in the plurality.

16. The character projection unit of claim 15 constructed in accordance with the following table and data and where the viewing screen for the character projection unit is designated in the table as element 14, the projections lenses in the first plurality are designated in the table as elements 40, the projection lenses in the second plurality are designated as elements 38, the film is designated as element 32, the condensor lens plate is designated as element 32, the condensor lens plate is designated as element 30, and the condensor lenses in the plurality are designated as element 28 and the light sources are designated as elements 18:

| ELE-MENT | RADII FOR FIRST SURFACE | RADII FOR SECOND SURFACE | LENS THICKNESS AND DISTANCE BETWEEN ELEMENTS | CLEAR APERTURE DIAMETER FOR FIRST SURFACE | | CLEAR APERTURE DIAMETER FOR SECOND SURFACE | MATERIAL |
|---|---|---|---|---|---|---|---|
| 14 | ∞ | ∞ | .0000 1.8552 | | Diagonal of screen = 1.0600 | | |
| 40 | .4633 | −1.1360 | .0570 .4859 | .2080 | Diagonal of Aperture Stop = .2000 | .2169 | Polycarbonate |
| 38 | A(1) | 1.7714 | .1173 .0791 | .3529 | | .3283 | Polycarbonate |
| 32 | −2.6030 | −2.6130 | .0100 .0000 | .2874 | | .2843 | Film |
| 30 | −2.6130 | −2.6530 | .0400 .0100 | .2843 | | .2808 | Polycarbonate |
| 28 | A(2) | −9.1950 | .0955 | .2756 | | .2550 | Polycarbonate |
| 18 | | | .1900 | | Clear aperture diameter of filament = .1092 | | |

NOTES
Dimensions are in inches
Focal length for condensor system = 1.0422 F/no = .9833
Focal length for projection system = .7116 F/No = 2.4041
Positive radius indicates the center of curvature is to the right.
Negative radius indicates the center of curvature is to the left.
General equation of any aspheric surface Z is:

$$Z = \frac{(CURV)Y^2}{1 + (1 - (1+K)(CURV)^2 Y^2)^{\frac{1}{2}}} + (A)Y^4 + (B)Y^6 + (D)Y^{10} \quad \text{where } Y = \text{height}$$

Constants for A (1) and A(2) are as follows:

| ASPHERIC | CURV = 1/R | K | A | B | C | D |
|---|---|---|---|---|---|---|
| A(1) | 4.52209783 | −.811442 | 2.19256E + 00 | 6.14583E + 00 | 0.00000E + 00 | 0.00000E + 00 |
| A(2) | 5.84274054 | −.946519 | −4.94153E + 00 | −6.54417E + 02 | 0.00000E + 00 | 0.00000E + 00 |

* * * * *